Aug. 3, 1965
J. LOUDON
3,198,463
PIPE HANGER
Original Filed Aug. 16, 1960
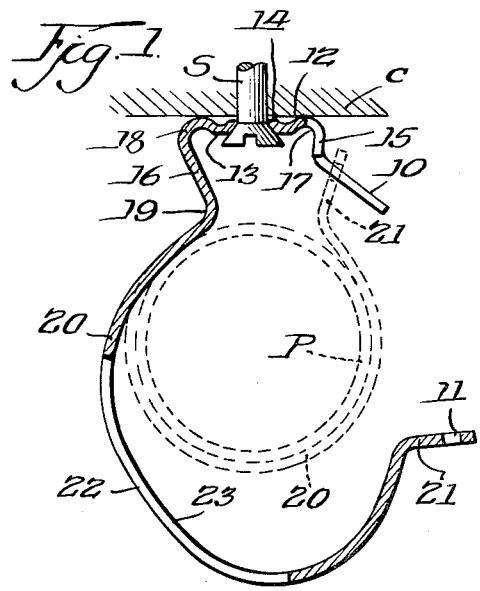
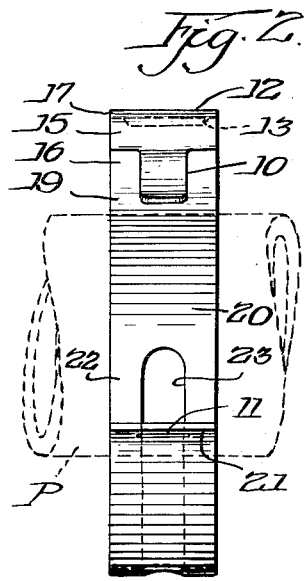
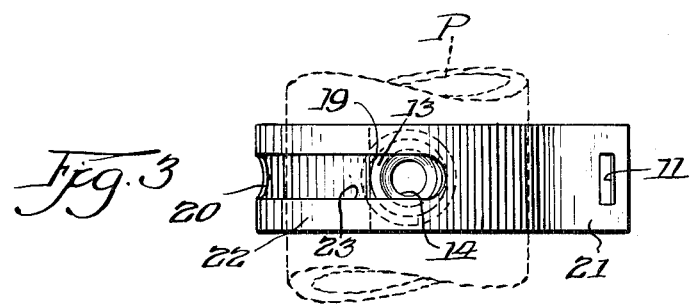
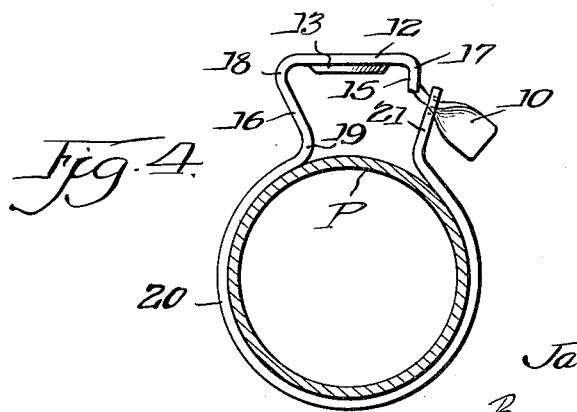
Inventor,
James Loudon
By Brown, Jackson,
Boettcher & Dienner
Attys.

3,198,463
PIPE HANGER
James Loudon, Arlington Heights, Ill., assignor to Minerallac Electric Company, Chicago, Ill., a corporation of Illinois
Original application Aug. 16, 1960, Ser. No. 49,888, now Patent No. 3,121,549, dated Feb. 18, 1964. Divided and this application July 30, 1963, Ser. No. 298,777
3 Claims. (Cl. 248—62)

The present application is a division of my application for patent Serial No. 49, 888, filed August 16, 1960, which issued as Patent No. 3,121,549, on February 18, 1964.

The present invention relates to a hanger or support for pipe, conduit and the like elongated elements.

It is an object of the invention to provide a pipe hanger which is easily mounted in place and simply and quickly locked in pipe securing condition.

Another object is the provision of a pipe hanger effecting close frictional contact with the pipe through a major portion of the circumference thereof.

Another object is the provision of a pipe hanger which accommodates itself to pipe varying from nominal or standard diameter.

It is another object to provide a pipe hanger which may be drawn up tightly about a pipe regardless of variations in the pipe diameter.

Another object is the provision of a pipe hanger which will support pipe loosely while lengths thereof are being coupled prior to locking of the hanger about the pipe so as to allow pipe movement and facilitate the coupling operation.

A further object is the provision of a pipe hanger which may be drawn up clampingly about a pipe and secured in the clamped relation by a single movement.

It is also an object of the invention to provide a pipe or like hanger bendable into clamping relation about a pipe with means for deforming the hanger to lock the same in the clamped relation.

Other and further objects, advantages, and features of the present invention will be apparent to those skilled in the art from the following detailed description, taken in conjunction with the accompanying drawings, in which:

FIGURE 1 is a longitudinal sectional view through a hanger according to the invention, showing the hanger in full lines in the open pipe-receiving position, and showing in dotted lines the hanger in clamping relation about a pipe;

FIGURE 2 is a side elevation of the hanger as shown in FIGURE 1, taken from the pipe-receiving side of the hanger;

FIGURE 3 is a bottom view of the hanger as shown in FIGURE 1; and

FIGURE 4 is an end elevational view of the pipe hanger locked in its pipe-clamping position.

Referring first particularly to FIGURES 1 to 3 inclusive of the drawings, there is shown a pipe hanger according to the invention which is formed of a length of suitable strap material of flexible metal or other suitable self-sustaining material, formed substantially to the initial shape shown in the drawing. The hanger is provided in different sizes corresponding to various sizes of pipe or conduit, as will be obvious. At one end of the strap, a tongue 10 of less width than the remainder of the hanger is formed by suitably cutting away portion of the material to leave the tongue protruding centrallly from an end edge of the hanger. An elongated slot 11 is formed adjacent the other end of the hanger, extending transversely thereof and dimensioned to receive the tongue 10 freely therethrough. Adjacent the tongue end of the hanger, there is formed a supporting or base portion 12 which is generally flat so that it may engage securely against a supporting surface, such as a wall or ceiling, but is provided with an annular indentation or embossment 13 about a central opening 14 through which a screw S or similar fastening means may extend into the supporting member, such as the ceiling C as shown in FIGURE 1. Spacer portions 15 and 16 are connected to opposite margins of the base portion 12 by bent portions 17 and 18, respectively, converging toward each other, or in other words toward the axis of the screw aperture 14. The spacer portion 15 is relatively short, and its associated bend 17 is formed on a smaller radius than the bend 18 by which the spacer portion 16 is connected to the base portion, and the portion 16 is of appreciably greater length than the portion 15. The portion 15 extends between the base portion and the tongue portion of the hanger, and has the tongue 10 projecting outwardly therefrom.

The end of the spacer portion 16 opposite that at the bend 18 is connected by a reverse bend 19 to the main body 20 of the hanger which is initially curbed adjacent the bend 19 to conform generally to the circumference of a pipe P to be supported thereby, the portion 20 extending outwardly of the spacer portion 16 in the present case due to the relatively large size of the pipe P. The hanger body 20 extends inwardly across the axis of aperture 14, curving generally toward the tongue 10 on a radius corresponding generally to that of the pipe. The hanger body terminates in an end portion 21 in which the slot 11 is formed, the portion 21 being bent relatively sharply outwardly from the body 20 and being spaced from the tongue by a distance approximately the diameter of the pipe to be supported. Between the point of the body 20 spaced farthest from the axis of aperture 14 and the point thereof spaced farthest from the base portion 12, the body 20 has a flattened portion 22, opposite which is the gap or opening between the tongue 10 and the end portion 21 through which a pipe may be moved into the hanger. Throughout the length of this flattened portion 22, and preferably extending beyond both ends thereof, there is formed a slot 23 extending longitudinally and centrally of the body 20. As will be apparent from FIGURE 1, the hanger in use is secured to the ceiling C or other support by means of the screw S, and after insertion of pipe P, the flattened portion 22 is bent so that the body 20 is wrapped and clamped about the pipe, the end portion 21 being brought adjacent the spacer portion 15. The slot 23 increases the flexibility of the hanger, so as to facilitate the necessary manual bending of the material to allow the hanger to engage with a close clamping fit about the circumference of the pipe.

As the hanger is bent around the pipe, the end portion 21 is brought into engagement with the tongue 10 and receives it in the slot 11 so that the free end portion of the tongue projects outwardly of the end portion 21. The corners of the tongue may be rounded or beveled so as to facilitate entry thereof into the slot 11. By reason of the relatively sharp bend between the end spacer portion 15 and the base portion 12, the end portion 21 may engage close to the base or root of the tongue, if necessary, so that the hanger will adjust to a pipe, conduit, or the like of smaller actual diameter or circumference than the nominal or standard diameter or circumference. Of course, if the pipe is somewhat larger than nominal or standard, the hanger will adjust thereto by engagement of the bent portion 21 farther from the root of the tongue. In addition to increasing the flexibility of the hanger, the slot 23 provides a means for applying a screwdriver or like tool along the axis of the aperture 14 for securing the screw S or other fastening means in the ceiling C or other supporting surface, and the end of the slot adjacent the end portion 21 may serve to guide and brace such a tool, as will be evident. The greater flexibility afforded by the slot 23 also permits the hanger being bent or wrapped around the pipe P without any great distortion of such portion or portions thereof as are initially curved to conform substantially to the circumference of the pipe. When a length of pipe or conduit is supported in a plurality of the hangers, after the hangers have been secured to the supporting structure and before the hangers have been clamped about the pipe, the pipe may be shifted longitudinally or radially to facilitate its being coupled to other lengths or sections of pipe, the weight of the pipe sections being borne primarily by the hangers to give greater freedom to the hands of a workman in securing the ends of the pipe sections together. In a ceiling-supported arrangement such as illustrated in FIGURE 1, the pipe when loosely disposed in the hanger is received in the lower curved portion adjacent the end portion 21, the hanger material having sufficient stiffness and rigidity to retain its curvature under the weight of the pipe and thus retain the pipe within the hanger. It will be appreciated that if the pipe is to be supported from a wall, the hangers are secured with the space or gap between the tongue 10 and the end portion 21 directed upwardly, the pipe in such case resting in the curved part of the body 20 adjacent the portion 16, as will be obvious. In either case, the pipe is inserted laterally or radially through the space between the tongue and the end portion 21, which is sufficiently great to admit the pipe without difficulty, although it need not be greater than the diameter of the pipe and may be smaller, since the flexibility of the hanger material allows ready deflection thereof to permit entry of the pipe.

After the pipe has been received in supported relation in the hanger, the body 20 is bent or wrapped around the pipe as already described and the end portion 21 moved inwardly along the tongue 10 to draw the hanger tightly about the pipe in clamping relation, and while the hanger is held so tightly clamped about the pipe, the free end portion of the tongue 10 projecting outwardly through the slot 11 is twisted, as best shown in FIGURE 4, so as to extend transversely of the slot 11 and prevent movement of the end portion 21 outwardly from the spacer portion 15. Thus the hanger is maintained in tightly clamped relation with the pipe or conduit. This is important in practice, particularly in electrical work, because the pipe must be held securely and withstand the pulling strains resulting from drawing of long lengths of wire therethrough. In addition, when the conduit is used as a ground, the tight clamping relation between the pipe or conduit and the hanger is necessary to assure a good ground connection. As already pointed out, the hanger will adjust to variations of the pipe dimensions from standard dimensions, and similarly it will adjust to conduts or pipe of the same internal diameter but of different wall thickness, such as thin-wall and heavy-wall electrical conduits. As already explained, the adjustment is accomplished by movement of the end portion 21 a greater or lesser distance along the tongue 10, or put another way, by the greater or lesser length of the tongue 10 projecting outwardly of the slot 11.

It will be apparent that instead of being twisted to retain the hanger in the pipe-clamping condition, the tongue 10 might be bent back upon itself or otherwise deformed, but that because of the limited space between it and the supporting structure such beinding is effectively ruled out. The practical difficulty and near-impossibility of accomplishing the bending in the small space available without allowng loosening of the hanger about the pipe, as well as the uneconomical expenditure of time required, makes such an operation altogether impractical. In addition, there would always be the danger that the tongue could not be bent sharply enough to prevent straightening of the tongue under the weight of the pipe, the tendency of the hanger to resume its open position, and vibrational stresses, so that the pipe would not be properly supported by the hanger. The twisting of the tongue to lock the ends of the hanger against separation provides a simple manner of securing the hanger in the desired tightly clamped relation on the pipe or conduit. It still involves maintaining the hanger in the clamped condition while twisting the tongue, and also avoiding such a sharp twisting of the tongue as to cause shearing of the material and thereby require replacement of the hanger. A wrench, pliers, or other suitable tool may be employed to twist the tongue, care being taken to avoid too sharp a pitch of the twist given to the tongue and to bring the end portion 21 as far along the tongue in the direction of the spacer portion 15 as possible in order to assure the proper tight clamping relation of the hanger on the pipe or conduit.

It will be evident that the present invention affords great advantages in supporting pipe from a wall or ceiling, in that it provides a simple arrangement which may be manipulated easily and quickly to provide the desired clamping support of pipe, conduit, or similar members. Particularly in overhead installations, the invention is of great advantage because of the simple and rapid mounting of the hanger and the easy, quick, and positive operation enabled thereby, which results in a better securement and support of the pipe or the like and a saving in time and expense, as well as in both muscular and nervous energy.

It is to be understood that the invention is not restricted to the single embodiment thereof herein disclosed, which is illustrated and described by way of example and not limitation, since it will be apparent that many modifications and variations may be made without departing from the scope of the invention.

I claim:

1. A pipe hanger comprising a relatively stiff flexible strap of set-retaining material bent to define a support portion including a flat central part with a securing means aperture and also including two side parts of unequal length bent from opposite ends of the central part in generally the same direction, a pipe-encircling portion of the strap joined to and curving away from the longer of said side parts and the support portion and curving partially back toward the support portion and the shorter side part, said encircling portion including a first curved part joined at one end to said longer part, an intermediate flattened part extending from the other end of the first curved part, and a second curved part connected at one end to the intermediate part and substantially conforming to the surface curvature of the pipe to be supported, one end portion of the strap extending generally radially outwardly of the second curved part at the other end thereof, a transverse slot in said one end portion, and a weakening slot extending longitudinally of the strap in said intermediate flattened part and having an end in tool-aligning relation to said securing means aperture, said shorter side part being bent on a smaller radius than the longer part and defining the other end portion of the strap, a locking tongue extending at an angle from the end of the shorter part, said one end portion and tongue being spaced apart by a distance not greatly less than the diameter of the pipe and arranged for projection of the tongue through the transverse slot upon bending of the encircling portion into embracing relation about the pipe. the tongue being deformable in projected position to lock the strap end portions against separation and hold the encircling portion under slight tension, said longer part having a length approximately equal to the length of the shorter part plus the distance between the transverse slot and the second curved part, and said encircling portion having a length less than the circumference of the pipe by approximately the distance between the longer part and the one end portion in said embracing relation, the stiffness of said strap being sufficient to allow the encircling portion to sustain the weight of at least the adjacent portion of a pipe received in the hanger before said securement of the opposite end portion by the tongue.

2. A pipe hanger comprising a relatively stiff flexible strap of set-retaining material bent to define a support portion including a flat central part with a securing means aperture and also including two side parts of unequal length bent from opposite ends of the central part in generally the same direction, a pipe-encircling portion of the strap joined to and curving away from the longer of said side parts and the support portion and curving partially back toward the support portion and the shorter side part, said encircling portion including a first curved part joined at one end to said longer part, an intermediate flattened part extending from the other end of the first curved part, and a second curved part connected at one end to the intermediate part and substantially conforming to the surface curvature of the pipe to be supported, one end portion of the strap extending generally radially outwardly of the second curved part at the other end thereof, a transverse slot in said one end portion, and a weakening slot extending longitudinally of the strap in said intermediate flattened part and having an end in tool-aligning relation to said securing means aperture, said shorter side part being bent on a smaller radius than the longer part and defining the other end portion of the strap, a locking tongue extending at an angle from the end of the shorter part, said one end portion and tongue being spaced apart by a distance not greatly less than the diameter of the pipe and arranged for projection of the tongue through the transverse slot upon bending of the encircling portion into embracing relation about the pipe, the tongue being deformable in projected position to lock the strap end portions against separation and hold the encircling portion under slight tension, said longer part having a length approximately equal to the length of the shorter part plus the distance between the transverse slot and the second curved part, and said encircling portion having a length less than the circumference of the pipe by approximately the distance between the longer part and the one end portion in said embracing relation.

3. A pipe hanger comprising a strap of stiffly flexible set-retaining material bent to define a support portion including a flat central part having means to accommodate securing means and also including two side parts of unequal length bent from opposite ends of the central part and extending to the same side thereof, a pipe-encircling portion of the strap curving away from and partially back toward the support portion, said encircling portion including a first curved part extending from the longer of said side parts, an intermediate flattened part extending from said first curved part, and a second curved part extending from said intermediate part and substantially conforming to the surface curvature of the pipe to be supported, one end portion of the strap extending generally radially outwardly of said second curved part at the end thereof opposite the intermediate part, a transverse slot in said one end portion, the shorter of said side parts of the support portion defining the other end portion of the strap, and a locking tongue extending at an angle from said shorter part, said one end portion and said tongue being initially spaced apart by a distance not greatly less than the diameter of the pipe and arranged for reception of the tongue through said slot upon bending of the encircling portion into embracing relation about the pipe to provide for locking the end portions against separation, said encircling portion having a length less than the circumference of the pipe by approximately the distance between the longer side part and the one end portion in said embracing relation.

References Cited by the Examiner
UNITED STATES PATENTS

| | | | |
|---|---|---|---|
| 890,125 | 6/08 | Crampton | 248—61 |
| 1,154,319 | 9/15 | Kennedy | 248—61 |
| 1,514,455 | 11/24 | Gordon | 248—59 |
| 2,304,973 | 12/42 | Vecchiola | 248—58 |
| 2,417,245 | 3/47 | Eggert et al. | 248—74 |
| 3,022,557 | 2/62 | Logan | 248—74 X |
| 3,027,128 | 3/62 | Liberty | 248—74 |

CLAUDE A. LE ROY, *Primary Examiner.*